United States Patent

[11] 3,615,868

[72] Inventor Robert Richard Melone
Des Plaines, Ill.
[21] Appl. No. 13,010
[22] Filed Feb. 20, 1970
[45] Patented Oct. 26, 1971
[73] Assignee Illinois Tool Works Inc.
Chicago, Ill.

[54] BATTERY CAP ASSEMBLY
10 Claims, 7 Drawing Figs.
[52] U.S. Cl. ............................................. 136/178,
73/327, 136/182, 137/559
[51] Int. Cl. ............................................. H01m 1/06
[50] Field of Search ............................................. 136/182,
178; 73/327; 137/559

[56] References Cited
UNITED STATES PATENTS
2,427,764 9/1947 Carson
2,558,654 6/1951 Kendall et al. ............................................. 136/178
2,690,467 9/1954 Kendal ............................................. 136/178
3,319,597 5/1967 Schnitzius et al. ............................................. 136/182
3,383,917 5/1968 Ryder et al. ............................................. 136/182

Primary Examiner—Donald L. Walton
Attorneys—Olson, Trexler, Wolters & Bushnell, Robert W. Beart, Michael Kovac, Barry L. Clark and Jack R. Halvorsen ABSTRACT: The present invention relates generally to combined battery cap and liquid level indicators and more particularly to such assemblies wherein the liquid level indicator comprises an elongate or rodlike body of light transmitting material. The embodiment of the invention disclosed herein includes a centrally apertured cap member having an annular valve seat with the elongate indicator member supported by and extending through the cap member. The outer extremity of the rodlike member provides a light receiving surface and the lower extremity is adapted for immersion within a battery fluid. An axially deflectable annular valve member is secured to and radiates from the indicator periphery, the valve member being normally biased into sealing engagement with the annular seat and arranged to preclude leakage of liquid through the assembly into an associated battery.

PATENTED OCT 26 1971    3,615,868
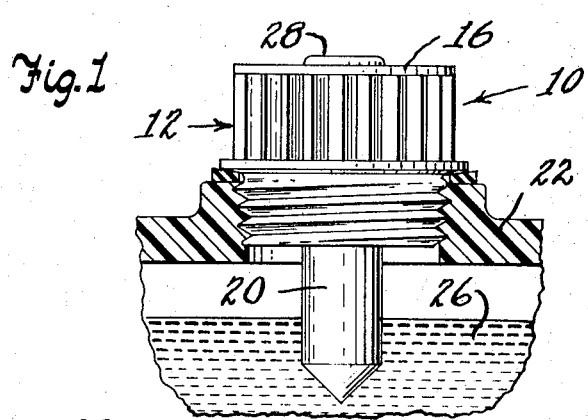
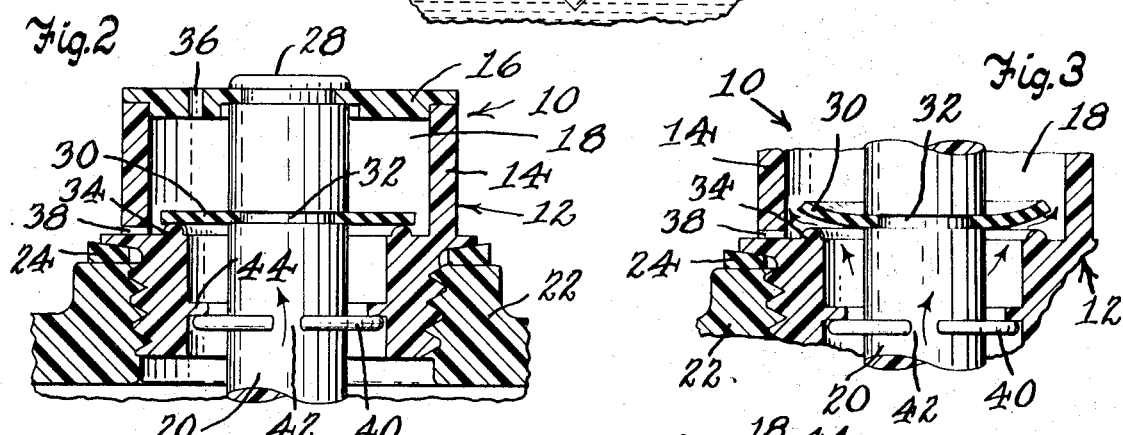
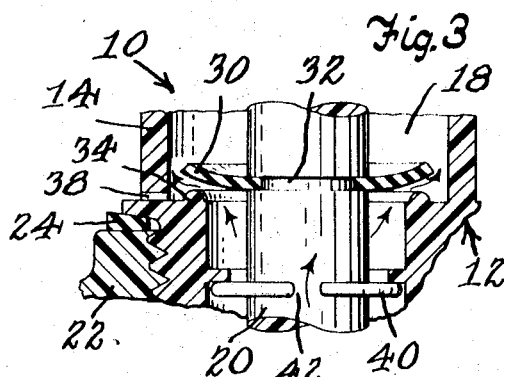
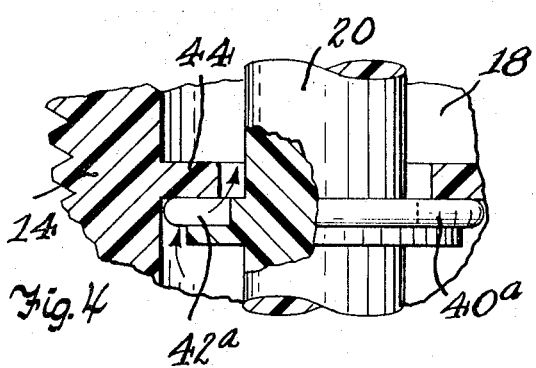
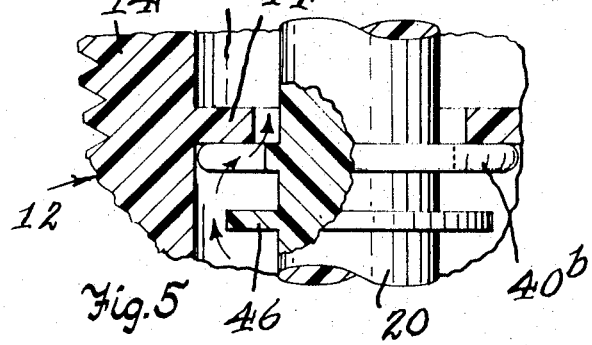
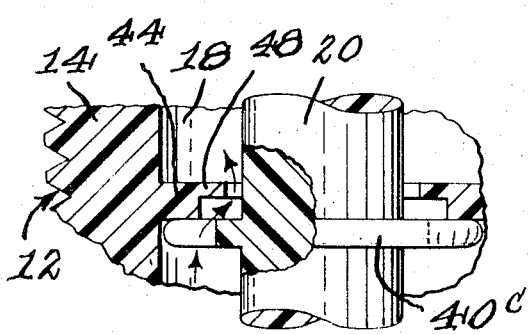
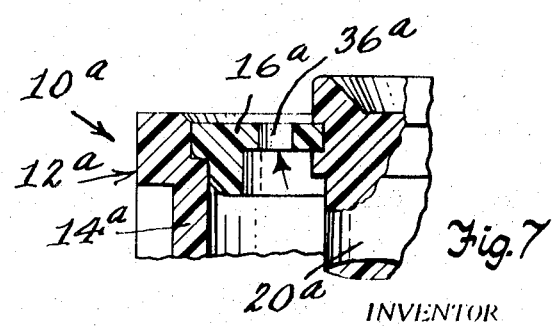
INVENTOR
Robert R. Melone
BY
Olson, Trexler, Wolters & Bushnell
Att'ys 3,615,868

1
BATTERY CAP ASSEMBLY

DISCLOSURE

One of the problems incident to the use of combined battery caps and elongate liquid level indicators is that of preventing moisture entering the cap from leaking or seeping into the battery liquid. Thus, in instances where batteries are used in association with submersible vehicles it is imperative that water be prevented from seeping through the cap and into the battery liquid. This is of particular importance, for example, in amphibious vehicles which for a short period of time may be submerged in sea water. It is, therefore, an important object of the present invention to provide a battery cap assembly of the type referred to above which is so constructed as to prevent liquid, such as water, from leaking into a battery through the cap structure.

The present invention also contemplates the cap assembly which will permit egress of gases from within the battery and also prevent liquids such as water from entering the battery chamber through the cap structure.

It is a further object of the present invention to provide a battery cap assembly having the above-mentioned functional characteristics which is very simple in structure, efficient in operation and adapted to be produced very economically.

The foregoing and other objects and advantages will be more apparent from the following detailed description, when considered in connection with the accompanying drawing, wherein:

FIG. 1 is an elevational view of a cap assembly of the type contemplated hereby, shown in association with a fragmentary sectional portion of a battery;

FIG. 2 is an enlarged central sectional view of the cap assembly of FIG. 1, the annular flexible valve member being shown in closed position;

FIG. 3 is an enlarged fragmentary section of the left portion of the cap assembly as shown in FIG. 2, illustrating the axially deflectable annular valve member is open, or upwardly deflected, position to permit egress of gases from the battery;

FIG. 4 is a fragmentary sectional view of the lower portion of the battery cap and the light transmitting liquid level indicator associated therewith, having a modified baffle structure;

FIG. 5 is a fragmentary sectional view similar to FIG. 4, disclosing another modified form of baffle;

FIG. 6 is a sectional view similar to FIGS. 4 and 5, disclosing a still further modified baffle arrangement; and FIG. 7 is a fragmentary sectional view of the upper left hand corner of a modified form of battery cap.

Referring now to the drawing more in detail, wherein like numerals have been employed to designate similar parts throughout the various FIGS., it will be seen that one embodiment of the battery cap assembly of the type contemplated by the present invention is designated generally by the numeral 10, in FIGS. 1, 2 and 3. The device 10 includes a cap 12 consisting of an annular wall section 14 and a closure or cover member 16. The wall section 14 defines an inner central area or chamber 18 and the closure member 16 is apertured to support the upper extremity of a light transmitting rod-like liquid level indicator 20. The lower portion of the cap 12 is provided with outer thread convolutions for cooperation with complementary internal thread convolutions in a battery case 22. A sealing gasket 24 serves to prevent leakage of fluid along the above-mentioned thread convolutions.

The elongate liquid level indicator 20 is suspended from the cover 16 as clearly shown in FIG. 2. The lower extremity of the indicator 20 is adapted to be immersed within battery liquid 26, as shown in FIG. 1. The upper exposed extremity of the indicator 20 provides a light receiving surface 28 which is adapted to receive and direct light rays downwardly, said rays being reflected upwardly by the lower conical extremity of the indicator 20 when the level of the liquid 26 falls below said conical extremity.

Particular attention is directed to an annular axially deflectable valve member 30, the inner margin or periphery of which is lodged within an annular peripheral recess 32 in the indicator 20. The outer margin of the annular valve member 30 is normally biased against an annular shoulder 34 of the cap 12. The portion of the shoulder 34 engaging the underside of the annular valve member 30 is preferably of limited cross section in order to more effectively establish a seal with said valve member. In FIG. 2 the valve member 30 is shown in closed position engaging the annular shoulder 34. Should the cap assembly be submerged within a body of liquid, as for example sea water, a vent aperture 36 in the cover 16 will permit sea water to enter the chamber 18 and exert pressure against the outer surface of the valve member 30. This serves to increase the pressure of the valve member 30 against the annular shoulder 34 and thus prevent liquid from entering the battery. Following such submersion, a second vent or drain opening 38 permits drainage of liquid from the chamber 18. While the annular member 30 is constantly biased toward the shoulder 34, it should be understood that the flexibility of the valve member is such as to open in response to the pressure of gases from within the battery when liquid pressure against the top surface of the valve has been released. This open position of the valve is indicated in FIG. 3.

To counteract the tendency for battery liquids to splash upwardly against the underside of the deflectable annular valve member 30, an annularly disposed baffle ring 40 is provided. Diametrically disposed openings 42 in the baffle ring 40 permit the egress of gases from the battery. The upper surface of the baffle 40 engages the underside of an annular flange 44 formed integral with the wall 14 of the cap 12. Modified arrangements of baffle structures are shown in FIGS. 4, 5 and 6. FIG. 4 discloses a baffle 40a which provides peripheral openings for passages 42a to permit the egress of gases from the battery. It will be noted that the baffle 42a differs from the previously described baffle 40 in the provision of an integral lower section which extends across the lower portion of the openings 42a and thus forms a labyrinth type passage. With this arrangement the possibility of battery liquid splashing into the area adjacent the valve member 30 is materially reduced.

In FIG. 5 a further modified type of baffle arrangement is shown. One baffle 40b is similar to the previously described baffle 40, and an additional baffle 46, spaced axially downwardly from the baffle 40b, is provided. As indicated by the directional arrows, the provision of the additional baffle 46 creates a labyrinth passage. Likewise in FIG. 6, b, a baffle 40c which corresponds with baffles 40 and 40b is provided. In addition, a second baffle 48 formed integral with and extending inwardly from the flange 44 is provided immediately above the baffle 40c. This arrangement, like the previously described structures, also establishes a labyrinth passage as indicated by the directional arrows in FIG. 6.

FIG. 7 illustrates a slightly modified form of battery cap assembly designated generally by the numeral 10a. The cap 12a of the assembly 10a includes an annular wall 14a and a cover or closure member 16a. The entire cover member 16a is nested within the inner periphery of the wall 14a. The cover 16a, like the cover 16, is centrally apertured to accommodate and support the upper extremity of an elongate light transmitting liquid level indicator 20a. The vent in the closure member 16a is designated by the numeral 36a and corresponds in function with the previously mentioned vent 36.

From the foregoing, it will be apparent that the present invention contemplates the provision of a very simple yet practical structural arrangement for battery cap assemblies wherein the cap serves as a support for an elongate or rod-like light transmitting liquid level indicator. Through the simple expediency of the axially deflectable annular valve member positioned along its inner margin adjacent the periphery of the liquid level indicator, the potential hazard of liquid leakage or seepage into a battery through the cap structure is precluded. While the flexibility of the annular valve member is such as normally to be biased into sealing engagement with the shoulder of the cap, the normal pressure exerted by the valve member against the shoulder is such as to permit automatic egress of gases from within the battery. The baffle arrangements cooperate to prevent battery liquid from being splashed into the vicinity of the valve member. The prismatic light receiving and reflecting means in the form of the conical tip at the lower extremity of the indicator member cooperates with the upper surface in indicating the level of the battery liquid.

The invention is claimed as follows:

1. A battery cap and liquid level indicator assembly including a cap member having an inner chamber and an annular valve seat extending into said chamber, an indicator member supported by said cap comprising a rodlike body of light transmitting material having an upper extremity providing an exposed level indicating light receiving surface and lower prismatic surface means for receiving light rays from and reflecting light rays to said level indicating surface, an annular axially deflectable valve member positioned along its inner margin adjacent the periphery of said rod-like member, said valve member radiating from the indicator periphery and normally biased into engagement with said annular seat but sufficiently flexible to open in response to the pressure of gases from a battery with which the cap may be associated, and fluid vent means in said cap above said valve seat.

2. A battery cap and liquid level indicator assembly as set forth in claim 1, wherein the indicator member is provided with a circumferential groove for accommodating the inner margin of the annular valve member.

3. A battery cap and liquid level indicator assembly as set forth in claim 1, wherein the vent means includes a liquid drain vent in the sidewall of the cap member.

4. A battery cap and liquid level indicator assembly as set forth in claim 1, wherein the vent means includes a vent in the upper portion of the cap and a lower drain vent in the vicinity of the annular valve seat.

5. A battery cap and liquid level indicator assembly as set forth in claim 1, wherein the annular valve seat is relatively narrow along the area of contact thereof with the underside of the annular valve member whereby to increase the sealing effectiveness of the valve member.

6. A battery cap and liquid level indicator assembly as set forth in claim 1, wherein the cap member is provided with an annular clamping surface, an externally threaded section below said clamping surface, and a sealing member positioned adjacent said clamping surface to preclude fluid leakage along the outer periphery of the cap member when said cap member is rotatably tightened in position upon a battery casing.

7. A battery cap and liquid level indicator assembly as set forth in claim 1, wherein annularly disposed baffle means is provided within the cap member to counteract the tendency for liquid within an associated battery from entering the area in which the annular valve member is located.

8. A battery cap and liquid level indicator assembly as set forth in claim 7, wherein the baffle means is arranged to form a labyrinth passage between the lower portion of the cap member and the annular valve member.

9. A battery cap and liquid level indicator assembly as set forth in claim 7, wherein the baffle means includes axially spaced baffle members forming a labyrinth passage between the lower portion of the cap member and the annular valve member.

10. A battery cap and liquid level indicator assembly as set forth in claim 7, wherein the baffle means includes an annular baffle member radiating outwardly from the periphery of the indicator member and a cooperative axially spaced annular baffle member extending radially inwardly from an inner surface of the cap member.

* * * * *